Oct. 30, 1956　　　P. C. JONES　　　2,768,663
LATHE AND DRILL PRESS ASSEMBLY
Filed Oct. 13, 1953　　　2 Sheets-Sheet 2
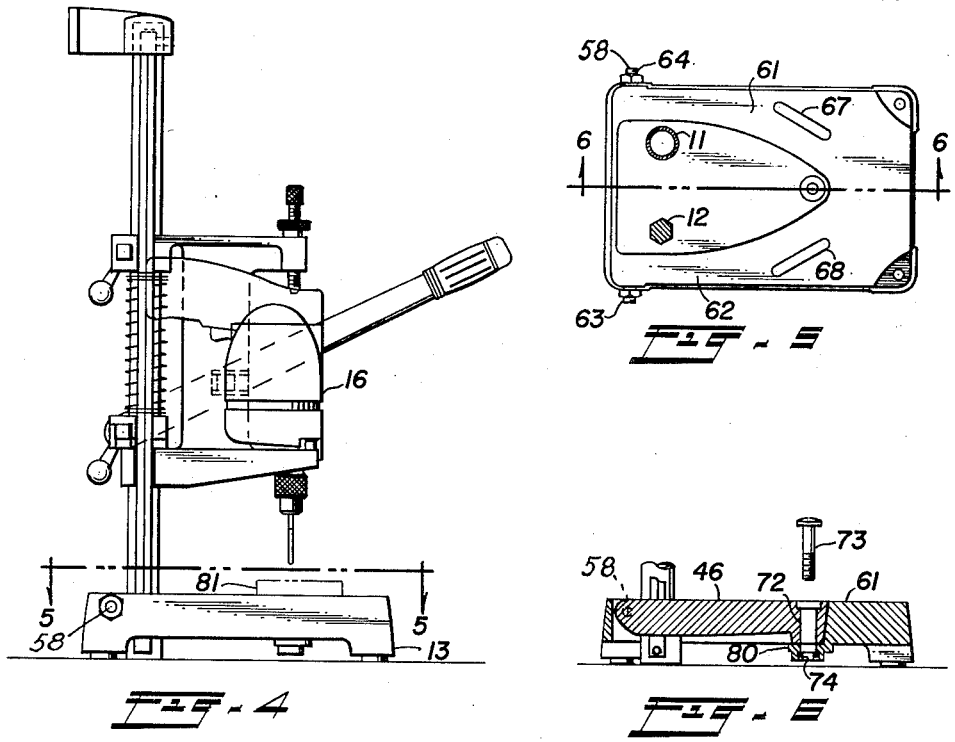
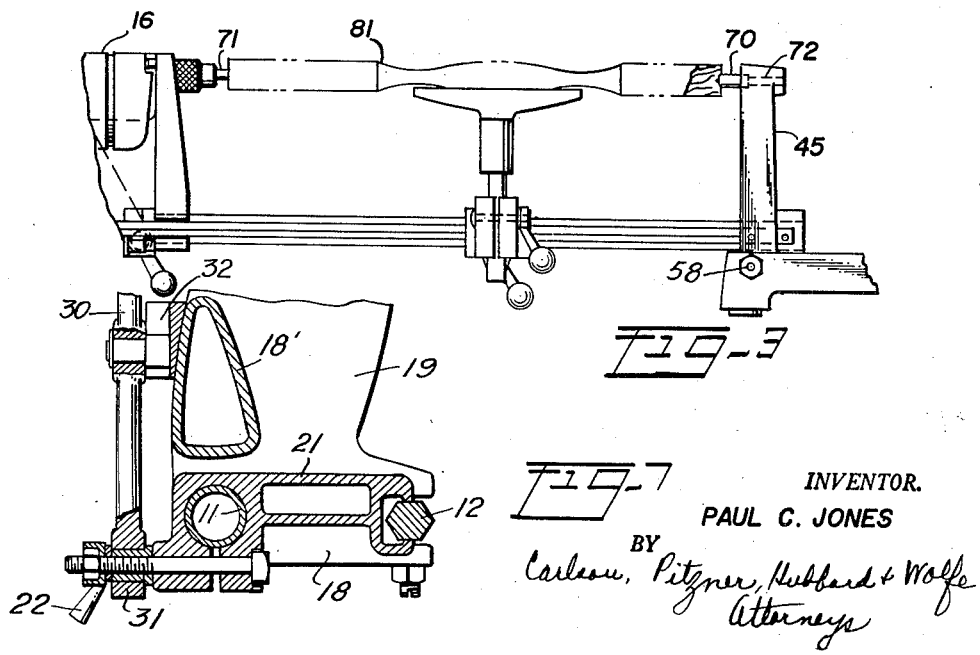
INVENTOR.
PAUL C. JONES United States Patent Office 2,768,663
Patented Oct. 30, 1956

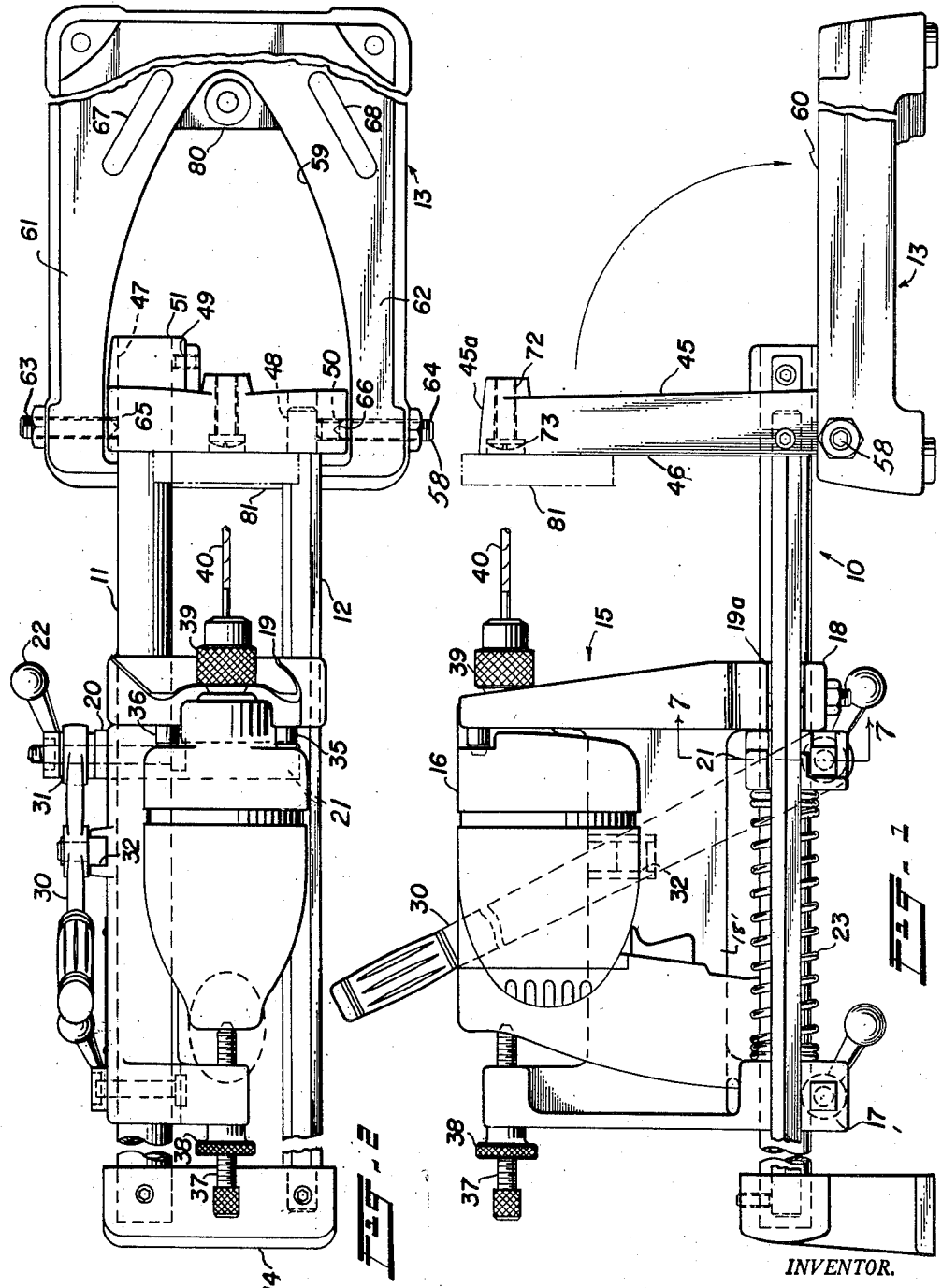

2,768,663

LATHE AND DRILL PRESS ASSEMBLY

Paul C. Jones, Wilmette, Ill., assignor, by mesne assignments, to John Oster Manufacturing Co., Racine, Wis., a corporation of Wisconsin Application October 13, 1953, Serial No. 385,807

9 Claims. (Cl. 144—1)

The present invention relates to lathe and drill press assemblies, and more particularly to a machine for performing both horizontal and vertical drilling operations.

It is an object of the present invention to provide a lathe and drill press assembly, capable of drilling both horizontally and vertically, which provides a substantially increased area of work supporting surface for vertical drilling. It is another object of the present invention to provide a machine of the above type which is relatively small in size and light in weight, and which nevertheless provides a work area for vertical drilling which is comparable to that provided in much larger and heavier vertical drilling machines. It is a more detailed object to provide a lathe and drill press assembly in which the member that carries the tail stock in turning operations also serves as a work-supporting surface both in horizontal and in vertical drilling and which includes a novel provision for securely and safely anchoring the member when the machine is used for vertical drilling. Finally, it is an object to provide a lathe and drill press assembly which is inherently sturdy, but nevertheless of light, inexpensive construction, and which may be converted from one operation to another with ease and efficiency.

Other objects and advantages of the invention will become apparent upon reading the attached detailed description and upon reference to the drawings, in which—

Figure 1 is an elevation of a lathe and drill press assembly incorporating the present invention and with the machine set up for horizontal drilling.

Fig. 2 is a top view of the machine shown in Fig. 1.

Fig. 3 is a fragmentary view in elevation similar to Fig. 1, but showing operation as a lathe.

Fig. 4 is an elevation showing the lathe bed swung into vertical position for vertical drilling.

Fig. 5 is a plan view of the base plate looking along the line 5—5 in Fig. 4.

Fig. 6 is a vertical section of the base plate taken along the line 6—6 in Fig. 5.

Figure 7 is a sectional view taken through Figure 1 along the line 7—7.

While the invention is described herein in connection with a preferred embodiment, it will be understood that I do not intend to limit the invention to such embodiment, but intend to cover all modifications and alternative constructions falling within the spirit and scope of the appended claims.

Turning now to Figure 1, the lathe bed 10 is formed of longitudinal way bars 11, 12 having way surfaces thereon. The lathe bed is supported at its right-hand end upon a stationarily mounted base plate 13 and its left-hand end upon a head support member 14.

Slidably mounted on the way surfaces is a tool carriage mounting a portable type electric drill 16. Such tool carriage is covered in some detail in a co-pending application Serial No. 389,025, filed October 29, 1953, in the name of Otto D. Doerner. As shown in the drawings, the tool carriage 15 has two upright end members 17 and 18 rigidly joined at one side by an integral web 18, the end members being spaced apart to receive the drill 16 between them. The lower ends of the members 17 and 18 are suitably bored to form spaced sleeves which are telescoped over the way bar 11. To provide lateral stability, at least one of the end members, in this instance the member 18, is made L shaped, having an integrally formed extension 19 provided with a notch 19a for slidably engaging the opposite way bar 12.

For the purpose of limiting movement of the tool carriage to a predetermined range, a clamp member 20 is provided which is bored to receive the way bar 11 and which has a lateral extension 21 for engaging the opposite bar 12. The clamp member 20 is preferably of split sleeve construction and is clamped and unclamped by rotating a handle 22 in one direction or the other.

In order to keep the tool carriage normally biased against the clamp member, and for resiliently opposing forward feeding movement thereof, a spring 23 is provided between the clamp member 20 and the opposed end member 17. To advance the tool carriage in a tool-feeding direction, a feed lever 30 is provided having a pivot connection 31 with the clamp member 20 and having a pivoted cross slide connection 32 with the tool carriage. With the feed lever 30 thus arranged, it will be apparent that manual feeding pressure applied to the handle at the outer end of the lever will produce advancement of the tool carriage along the ways to feed the drill or other tool into a workpiece, the carriage being returned to its initial position by the action of the spring 23.

To insure that the portable drill 16 is anchored securely in place, a three point mounting is provided in carriage 15. Such mounting includes a pair of studs 35, 36, on the front end member 18, which are received in registering holes at the front of the drill and a clamping screw 37 and adapted to engage the rear end of the drill. The clamp screw threaded through the rear end member 17 is locked in place by a knurled locking nut 38. The portable drill as set up in Figs. 1 and 2 includes a chuck 39 mounting a drill 40.

With the construction of the movable tool carriage in mind, attention may next be given to the novel construction of the base structure and its associated parts. In accordance with the invention, the base structure is constructed of two interfitting or telescoping parts, namely an outer or main base 13 and an inner or sub-base 45. The latter is rigidly mounted at the right-hand ends of the bars 11 and 12. This sub-base is of plate-like construction, having a flat face 46 and holes 47, 48 bored to receive the bars 11, 12, respectively. The bars are retained securely in position by set screws 49, 50. In the case of the bar 11, which is of heavier construction than the bar 12, a tubular extension or boss 51 provides additional support. When the device is set up for horizontal drilling, as shown in Fig. 1, the sub-base serves as a drill table having limited area, capable of handling most normal jobs as well as jobs where minimum table area is essential.

In accordance with the present invention, the sub-base 45 is hinged at its lower edge, as at 58, to the main base plate 13, which, as indicated above, is constructed to nestingly receive the sub-base 45 for providing additional drill table area for vertical drilling. This is accomplished in the present instance by forming in the base plate 13 a recess 59 having an outline which conforms to the outline of the sub-base 45 and by providing a flat, upwardly facing surface 60 on the base plate which is flush with the flat surface 46 on the sub-base when the latter is in nested position for vertical drilling. The hinge 58 is located beneath the work surface 60 on the main base, and the hinge axis, of course, is spaced equal distances from the planes of the surfaces 60 and 46 on the main and sub-bases, respectively.

To facilitate swinging the sub-base into its nested horizontal position, side walls 61, 62 are provided on opposite sides of the recess 59. Received in such sidewalls are set screws 63, 64 having pointed ends which engage registering conical depressions 65, 66 in the tail stock. The set screws are locked in position by suitable lock nuts.

In the preferred embodiment, both the sub-base 45 and its corresponding recess 59 have a profile which somewhat resembles a flat iron but which has a rounded nose portion 45a. Such shape not only presents a pleasing appearance, but in addition provides certain functional advantages, the sub-base comprising, in effect, a cantilever-mounted beam of constant strength which utilizes to the highest degree the material of which it is made. The rigid support and the accurate orientation of the workpiece provided by the sub-base during both horizontal and vertical drilling is contrasted with the flimsy and inaccurate drill tables usually provided on lightweight combination tools of the present type. The shape of the sub-base provides a further advantage in that it enables the base plate 13 to be strongly constructed, yet light in weight, presenting a relatively large and continuous table area. It may be noted from the drawing that this area exceeds the drill table area to be found on heavier and more expensive drill presses. If desired, the drill table may be provided with angularly positioned slots 67, 68, for receiving clamping bolts or the like for clamping a workpiece onto the drill table.

Still another advantage is realized by the shape of the sub-base when the device described above is employed as a lathe (Fig. 3). In such case, the sub-base serves as a support for a tailstock on deadcenter 70 which cooperates with a live center 71 carried by the drill chuck for supporting the respective ends of the workpiece. The deadcenter 70 is received in a bore 72 in the tailstock closely adjacent its narrow or free end thus providing ample clearance for tools operating at or near the end of the work piece. The tools can thus be presented at the most advantageous angle without interference from the tailstock supporting structure.

In accordance with one of the more detailed features of the present invention, the same bore which is used to mount the deadcenter 70 is employed to receive a hold down bolt 73, such bolt engaging a nut 74 which may be permanently mounted in the base plate in alinement with the hole 72. For the purpose of positively locating the sub-base 45 in its horizontal position so that the surface 46 thereon is flush with the surface 61 on the main base plate, a stop 80 is provided in the base plate. This stop bridges over the apex of the opening 59 in the base plate, as shown in Figs. 2 and 6, and serves as a rigid mount for the fastening nut 74. Although the device has a high degree of stability when in the vertical drilling position, nevertheless the possibility of rearward toppling may be obviated simply by screwing home the bolt 73. As a further feature of the construction, the bolt head may be recessed into the table as shown, permitting the tip of the drill, when fully extended, to project a small amount beyond the surface of the drill table, and to insure drilling "through" the workpiece.

Although the advantageous features of the present construction will be apparent from the foregoing description, it may help to summarize briefly the two modes of operation illustrated in Figs. 1 and 4, respectively, a workpiece 81 being shown by way of example. Under some conditions and with certain types of workpieces, it is convenient to drill holes with the drill press horizontal, and where this is done the sub-base 45 constitutes an auxiliary drill table which is not only rigid and accurately oriented but which has adequate area for many drilling operations. The relatively limited area of the sub-base may, in fact, be of extreme advantage when drilling small U-shaped or L-shaped pieces of stock, or pieces having projections requiring rearward clearance. However, where a larger work surface is required, this may be readily achieved with the present device simply by rotating the lathe bed into the vertical position illustrated in Figs. 4 and 6. In such position the sub-base is accurately positioned by the stop 80 within the main base plate. The entire body of the sub-base is nestingly received in the main base plate, providing a smoothly continuous work area having two to three times the area of the sub-base and thus affording ample support for work pieces of any reasonable size.

When employed for turning, the lathe bed is swung into horizontal positions and the centers 70 and 71 applied to their respective supports. The work piece may be easily clamped and unclamped by shifting the tool carriage back and forth on the bed. Due to the clearance provided by the novel shaping of the tailstock support, tools may be held at an angle to the work piece even when operating at the extreme tail end thereof.

I claim as my invention:

1. In a lathe and drill press assembly, the combination comprising a lathe bed, said lathe bed having horizontal ways and having a tool carriage and tailstock support mounted thereon, means for mounting a drill axially on said carriage, a base plate for supporting said lathe bed and extending beyond said tailstock support when the lathe bed is in horizontal position, said tailstock support having a horizontal hinge connection with said base plate, so that the lathe bed may be swung upwardly into vertical position for vertical drilling, said tailstock support being of plate-like construction having a flat work-engaging surface perpendicular to the axis of the tool carriage for supporting a workpiece during both horizontal and vertical drilling, and a work supporting surface on said base plate arranged to be in alinement with the work engaging surface on said tailstock support when the lathe bed is in its vertical position to provide additional work supporting surface.

2. In a lathe and drill press assembly, the combination comprising a lathe bed, said lathe bed having horizontal ways and having a tool carriage and tailstock support mounted thereon, means for mounting a drill axially on said carriage, a base plate for supporting said lathe bed and extending beyond said tailstock support when the lathe bed is in horizontal position, said tailstock support having a horizontal hinge connection with said base plate, so that the lathe bed may be swung upwardly into vertical position for vertical drilling, said tailstock support being of plate-like construction having a flat work-engaging surface perpendicular to the axis of the tool carriage for supporting a workpiece during both horizontal and vertical drilling.

3. In a lathe and drill press assembly, the combination comprising a lathe bed, said lathe bed having a pair of normally horizontal way members and having a tool carriage and tailstock support mounted thereon, a base plate for supporting said lathe bed and extending beyond said tailstock support when the pathe bed is in horizontal position, said base plate having a flat upwardly facing work surface, a horizontal hinge connection between said lathe bed and base plate, said tailstock support being of plate-like construction having a flat work-engaging surface, said base plate having a central recess shaped to nestingly receive the tailstock support when the lathe bed is swung bodily upward into vertical position, the hinge connection being located below the level of the work surface on said base plate and being in such relation to the flat work engaging surface on the tailstock support that the flat surface on said tailstock support when in nested position is flush with the flat surface on the base plate.

4. In a lathe and drill press assembly, the combination comprising a lathe bed, a drilling tool carriage, said lathe bed having normally horizontal ways and having a tail stock support fixed at one end thereof, a base plate having a central recess defining a pair of opposed walls, said tailstock support being of plate-like construction and dimensioned to extend transversely between said opposed walls, pivots in said walls for pivoting the tail stock support for bodily movement between an upstanding position and a lowered position in which the tailstock support is nestingly received in the base plate so that the tailstock support and baseplate together provide an extensive work surface for vertical drilling operations.

5. In a lathe and drill press assembly, the combination comprising a lathe bed, said lathe bed having horizontal ways and having a tool carriage tailstock support mounted thereon, a base plate for supporting said lathe bed and extending beyond said tailstock support when the lathe bed is in horizontal position, said lathe bed having a horizontal hinge connection with said base plate, said tailstock support being of plate-like construction having a flat work-engaging surface and a central aperture for receiving a dead center, said base plate providing a threaded connection which is alined with said aperture when the lathe bed is swung bodily into a vertical position, and threaded means insertable into said aperture to engage the threaded connection on said base plate for clamping the tailstock support rigidly to the base plate.

6. In a lathe and drill press assembly, the combination comprising a lathe bed, said lathe bed having horizontal ways and having a tool carriage and tailstock support mounted thereon, a base plate for supporting said lathe bed and extending beyond said tailstock support when the lathe bed is in horizontal position, said lathe bed having a horizontal hinge connection with said base plate, said tailstock support having a relatively flat body presenting a flat work-engaging surface and having a central bore for receiving a dead center, and means insertable through said bore for engaging said base plate and for holding the tailstock support in contact therewith when the lathe bed is swung bodily into a vertical position.

7. In a drill press for horizontal and vertical drilling operations: means defining an elongated longitudinal support; means supporting said longitudinal support in a horizontal position, comprising a base plate adjacent to one end portion of the longitudinal support, and means pivotally connecting said end portion of the longitudinal support with the base plate for swinging motion of the longitudinal support out of said horizontal position to a vertical position about a horizontal axis transverse to said longitudinal support; a drill head adjustably mounted on the longitudinal support for movement lengthwise thereof toward and from the base plate; an auxiliary drill table secured to said end portion of the longitudinal support adjacent to the base plate, said auxiliary drill table having a flat work-engaging surface facing the drill head and lying in a plane normal to said longitudinal support, and upon which work may be supported during horizontal drilling operations, swinging movement of the longitudinal support to said vertical position disposing the auxiliary drill table with its flat work-engaging surface in a horizontal plane; and means forming part of the base plate providing a horizontal upper work-engaging surface thereon which is coplanar with and forms a continuation of the work-engaging surface of the auxiliary drill table in the vertical position of the longitudinal support, said work-engaging surfaces of the base plate and the auxiliary drill table having a combined area which is considerably greater than that of the auxiliary drill table alone, for supporting work during vertical drilling operations.

8. The drill press set forth in claim 7 wherein the base plate is provided with a recess therein opening to said horizontal upper surface thereof, said recess having substantially the same outline as that of the auxiliary drill table and being disposed to receive the auxiliary drill table when said longitudinal support is swung to its vertical position; and further characterized by the provision of stop means on the base plate engaged by the auxiliary drill table when the latter is nested in said recess for defining the vertical position of said longitudinal support at which said work-engaging surfaces on the base plate and the auxiliary drill table are coplanar.

9. The drill press set forth in claim 8 wherein the auxiliary drill table has an aperture therein positioned to align coaxially with a drill in the drill head; and further characterized by the fact that the stop means on the base plate is located adjacent at the bottom of the recess in the base plate and to have the apertured portion of the auxiliary drill table seat thereon, said stop means having a threaded hole therein aligning with the aperture in the auxiliary drill table when the latter is nested within said recess so that a screw inserted in said aperture and threaded into the hole in the stop means will securely clamp the auxiliary drill table to the base plate and thus hold the longitudinal support in its vertical position.

References Cited in the file of this patent
UNITED STATES PATENTS 1,167,091     McGill _____ Jan. 4, 1916